March 26, 1929. S. IMERMAN 1,706,885
VALVE SPRING RETAINER
Filed June 24, 1927
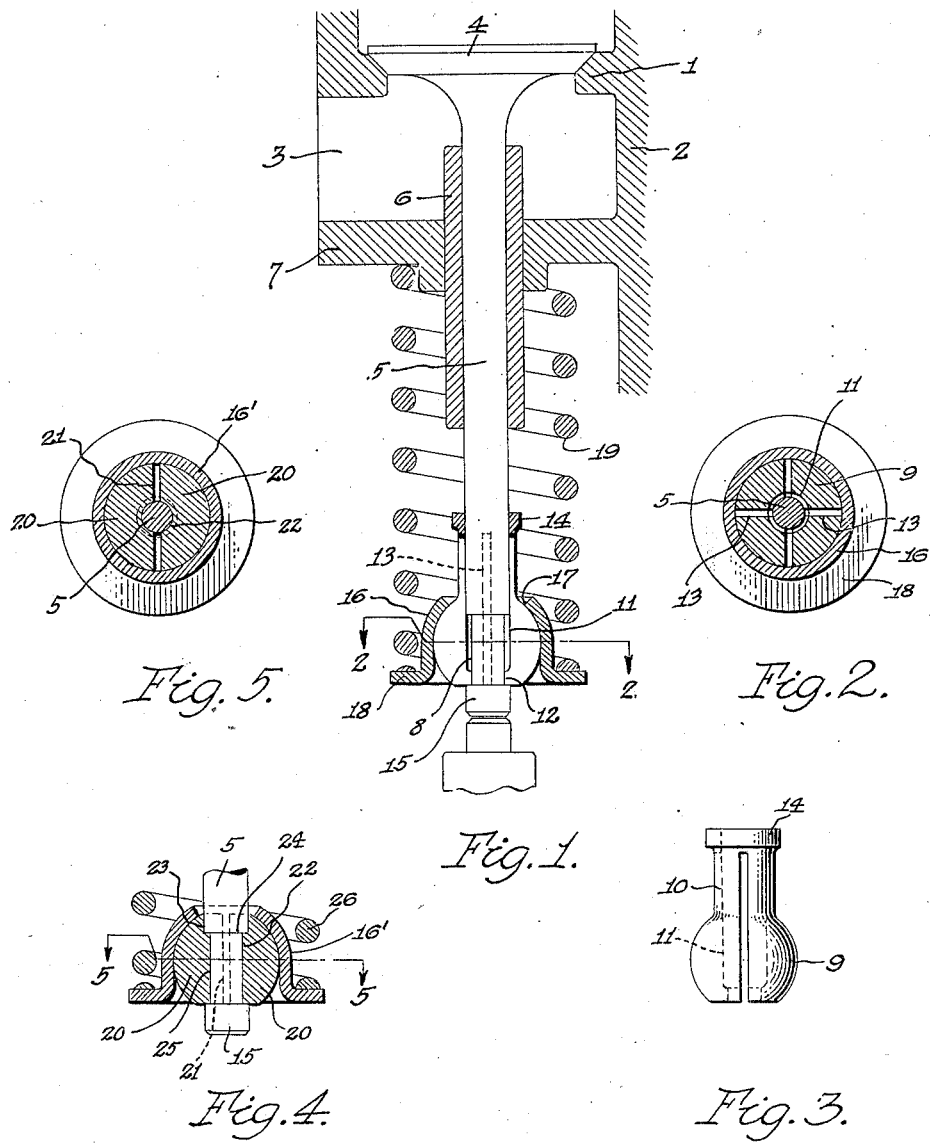
Inventor
Stanley Imerman,
By
Attorneys Patented Mar. 26, 1929.

1,706,885

UNITED STATES PATENT OFFICE.

STANLEY IMERMAN, OF DETROIT, MICHIGAN, ASSIGNOR TO CHALON E. BRIDWELL, OF DETROIT, MICHIGAN.

VALVE-SPRING RETAINER.

Application filed June 24, 1927. Serial No. 201,123.

The object of the present invention is to provide a valve spring retainer which will permit the valve stem to maintain a fixed and true axis regardless of the plane of the spring which surrounds the valve stem.

A poppet valve in many instances requires a flange for taking the pressure at one end of a spring surrounding the valve stem for the purpose of normally drawing the valve to closed or open position. This flange is in present practice a part of a removable member which is fixed in a plane perpendicular to the axis of the valve stem. If the end of the spring bearing on the flange is not perpendicular to the valve stem axis, the spring will have a tendency to throw the valve stem out of its true axis. As a result of this tendency, the valve stem will not run straight in its bushing and will wear the interior of the bushing with the consequent development of a leak therethrough.

The present invention overcomes this difficulty by providing a spring-retaining flanged member which does not necessarily occupy a fixed plane relative to the axis of the valve stem. The flanged member is a flanged socket enclosing a ball carried by the valve stem. If the end of the spring is not perpendicular to its axis, it will merely shift the socket member on the ball without creating any stress of the valve stem against its bushing.

The invention is fully disclosed by way of example in the following description and in the accompanying drawings, in which—

Figure 1 is a longitudinal section of a valve assembly equipped with the invention;

Fig. 2 is a transverse section on the line 2—2 of Figure 1;

Fig. 3 is an elevation of the socket member;

Fig. 4 is a detail elevation of a modified construction; and

Fig. 5 is a section on the line 5—5 of Figure 4.

Reference to these views will now be made by use of like characters which are employed to designate corresponding parts throughout.

In Figure 1 is illustrated a valve seat 1 formed in a casting 2 which is also provided with a passage 3 communicating with the valve seat. On the seat is mounted a poppet valve comprising a head 4 and a stem 5 which slides in a bushing 6 secured to a wall 7 of the passage 3.

The free end of the valve stem is reduced near its tip as at 8 and is surrounded by a ball member of the type shown in Figure 3. This member has a ball shaped portion 9 from which extends a neck 10. It has a cylindrical cavity 11 of substantially the same diameter as the unreduced part of the valve stem 5 and has at its lower end a flange 12 extending into the cavity for engagement with the reduced part 8 of the valve stem. The member is split lengthwise and radially as at 13 in several places. The splits extend as far as but not through the free end 14 of the neck 10 and permit the device to be spread during application to the valve stem so that the flange 12 may pass the valve stem tip 15, which is of regular diameter, and enter the cavity 11 to engage the reduced end 8.

Over the ball member 9 is mounted a partially spherical socket member 16 adapted to move universally on the ball member. The socket member has an aperture 17 in its dome. In assembling the device, the socket member is preferably applied to the valve stem before the ball member, the neck 10 of which is adapted to pass through the aperture 17. The lower edge of the socket member has an outwardly extending flange 18 on which the spring 19 surrounding the valve stem is adapted to bear.

If the lower end of the spring is in a plane not perpendicular to the axis of the valve stem 5, the socket member will be tilted correspondingly but will not throw or tend to throw the valve stem out of the axis of the bushing 6. This is in contra-distinction to present constructions wherein the spring-engaged flange is immovable relative to the valve stem and thereby permits an inaccuracy in the plane of this end of the spring to stress the valve stem in the bushing, as a result of which the bushing becomes worn and leaks are developed. In dismantling the device of the invention, the socket member is pushed towards the wall 7 against the action of the spring 19, and the ball member is spread and withdrawn. After removal of the ball member, the socket member falls away from the valve stem.

In the embodiment illustrated in Figures 4 and 5 the ball member consists of a simple sphere 20 split diametrically at 21 for application to the valve stem at the reduced end thereof. The segments of the sphere are suitably cored as at 22 to fit around the reduced end of the valve stem, but since they are of a greater diameter than the length of this reduced portion, they are internally chamfered as at 23 to accommodate the upper shoulder 24 of the reduced end. The major portion of the inner walls of the segments thus constitute projections 25, corresponding to the flange 12, engaging the reduced part of the valve stem. The ball member is enclosed in a socket member 16' similar to the member 16 already described. This device is dismantled by lifting the socket member against the action of the surrounding spring 26, whereupon the ball segments may readily be removed from the valve stem.

Although a specific embodiment of the invention has been illustrated and described, it will be understood that various alterations in the details of construction may be made without departing from the scope of the invention as indicated by the appended claims.

What I claim is:—

1. A valve stem retainer comprising a ball member adapted for attachment to a valve stem and presenting more than half of a complete spherical surface, a socket member enclosing said ball member and movable relatively thereto, said socket member having an exterior flange adapted for engagement by a valve spring.

2. A valve stem retainer comprising a ball member adapted for attachment to a valve stem and presenting more than half of a complete spherical surface, a hollow neck extending from said ball member, said ball member and neck being split, a socket member enclosing said ball member and movable relatively thereto, said socket member having an exterior flange adapted for engagement by a valve spring.

In testimony whereof I affix my signature.

STANLEY IMERMAN.